Feb. 9, 1965  H. GREENWALD  3,168,947
ROTARY COIN METER

Filed Aug. 8, 1962  4 Sheets-Sheet 1

INVENTOR.
Harry Greenwald
BY Irving Seidman
ATTORNEY

Feb. 9, 1965    H. GREENWALD    3,168,947
ROTARY COIN METER
Filed Aug. 8, 1962    4 Sheets-Sheet 2
FIG. 4
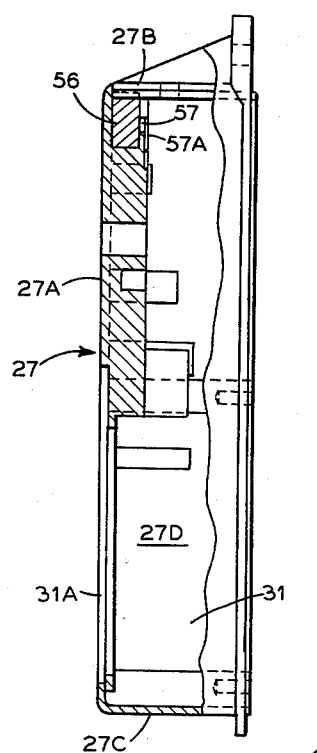
FIG. 3
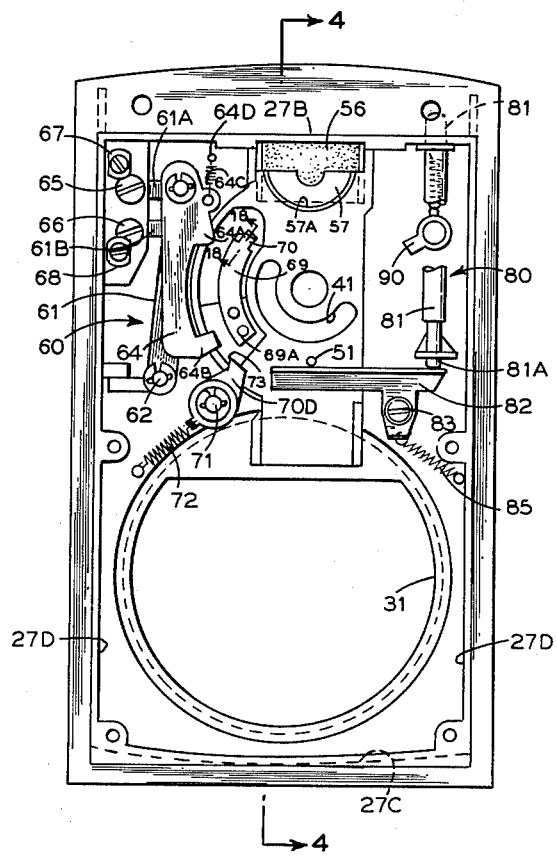
FIG. 17
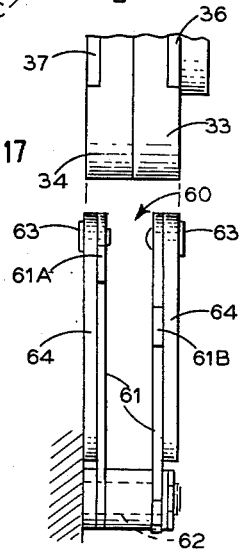
FIG. 16
FIG. 18
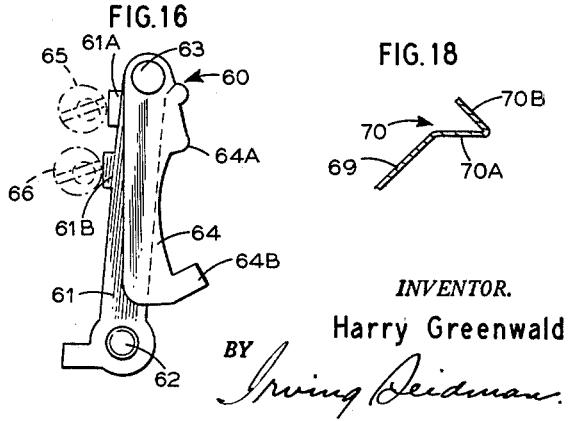
INVENTOR.
Harry Greenwald
BY
Irving Seidman
ATTORNEY

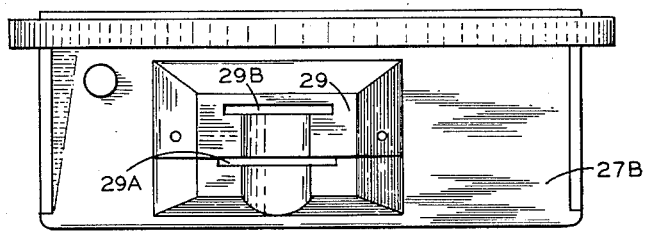
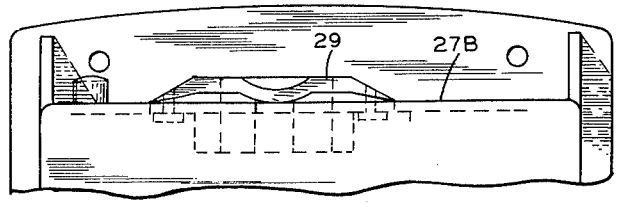
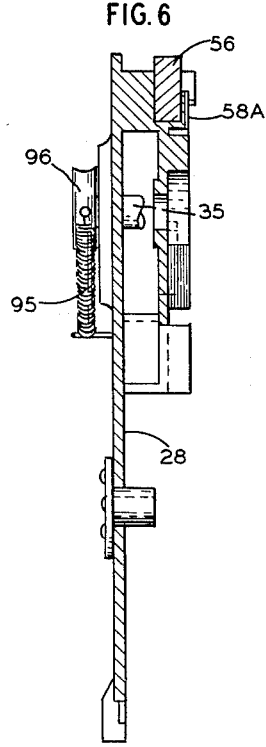
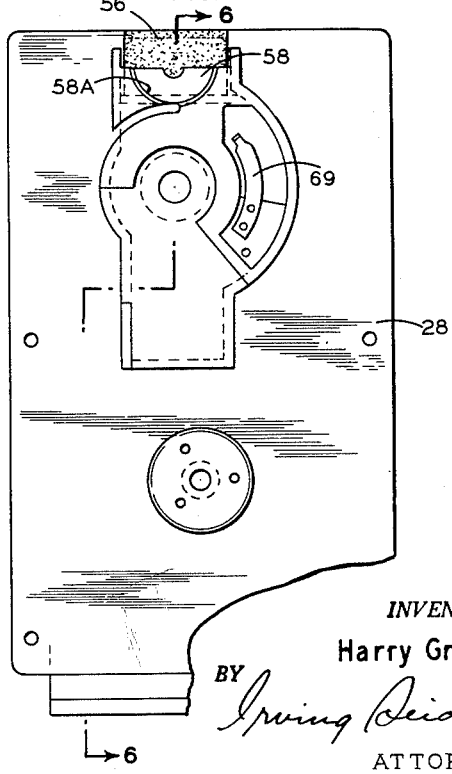
INVENTOR.
Harry Greenwald

Feb. 9, 1965   H. GREENWALD   3,168,947
ROTARY COIN METER

Filed Aug. 8, 1962   4 Sheets-Sheet 4

INVENTOR.
Harry Greenwald
BY
Irving Seidman
ATTORNEY

United States Patent Office 3,168,947
Patented Feb. 9, 1965

3,168,947
ROTARY COIN METER
Harry Greenwald, 149—47 Powells Cove Blvd., Whitestone, Long Island, N.Y., assignor of one-third to Louis Wolff and one-third to Harry Silbergiait, both of Brooklyn, N.Y.
Filed Aug. 8, 1962, Ser. No. 215,724
7 Claims. (Cl. 194—61)

This invention relates in general to the coin meter art, and more specifically this invention relates to a mechanical rotary coin meter adapted for use on various types of coin operated vending machines or the like.

An object of this invention is to provide a compact mechanical rotary coin meter in which the vertical distance of the coin drop therethrough is minimized.

Another object is to provide for a multiple coin rotary meter constructed and arranged so as to be rendered operative only upon the insertion of prescribed properly sized negotiable coins.

A more specific object is to provide a duplex rotary coin meter constructed and arranged so as to be rendered operative only upon the insertion of two acceptable coins or tokens.

Still another object is to provide a rotary coin meter with provisions for detecting between acceptable coins and unacceptable coins and the like.

Still another object is to provide a rotary coin meter with provisions for rendering the coin meter inoperative upon the detection of an unacceptable coin or upon an omission of a coin deposit.

Still another object is to provide a rotary coin meter with provisions for ejecting a coin therefrom.

Another object is to provide in a rotary coin meter provisions for committing operation of the meter upon rotation of the coin carrier beyond a predetermined point when operated with acceptable coins.

Still another object is to provide a rotary coin meter with provisions for prohibiting one from using an adhesive tape in an attempt to circumvent proper utilization of the meter.

In accordance with this invention the foregoing objects and other features and advantages of this invention are attained by a rotary meter comprising a housing having a coin slot for receiving a coin or coins. Disposed within the housing is a coin carrier which is rotatable between coin receiving position and coin discharging position. In accordance with this invention the coin carrier comprises a hollow disc like element which is provided with an external coin seat or recess for receiving the coin deposited. Included in the coin carrier are means for ejecting the coin deposited if for any reason it is desired to remove the coins therefrom or in the event the coin is rendered unacceptable to the meter. A coin reject actuator, disposed exterior of the meter housing, is operatively associated with the ejecting means of the coin carrier. Means are also provided for detecting between various acceptable and unacccept-able type coins. The coin detection means are operatively associated with the coin carrier so as to render the latter inoperative in the event an unacceptable coin is deposited. The detection means include magnetic means for detecting slugs formed of a ferrous metal, means for detecting washer type slugs, and means for detecting improperly sized coins. Also means are provided for cutting an adhesive tape, frequently used by unscrupulous individuals, to circumvent proper operation of coin meter. Means are also provided to commit operation of the coin meter upon upon rotation of the carrier beyond a predetermined point in the event the coins deposited are acceptable to the meter.

More specifically the rotary coin meter of this invention is constructed and arranged to simultaneously achieve and be rendered operative upon the receipt of a plurality of coins which may be either of similar or dissimilar denominations, and the above mentioned coin detecting means are rendered operative on each of the coins deposited.

A feature of this invention resides in the provision of a duplex rotary coin meter adapted to receive two coins which may be of the same or dissimilar size and/or denomination.

Another feature resides in the provision of various means operating on each of the coins deposited for detecting between the acceptability or unacceptability of each coin deposited.

Still another feature resides in a novel duplex coin carrier rotatably mounted within the housing of the meter for receiving the respective coins and including means actuated by an externally disposed actuator for ejecting the coins from the carrier for any reason.

Other features and advantages will be rendered more apparent to one skilled in the art when considered in view of the description and drawings in which:

FIG. 3 is a rear elevation view of the coin meter similar to that of FIG. 2, but with the coin carrier removed.

FIG. 4 is a sectional view taken along line 4—4 of FIG. 3 of the front casting.

FIG. 5 is an elevation view of the rear or back casting of the housing.

FIG. 6 is a sectional view taken along line 6—6 of FIG. 5 of the back casting.

FIG. 7 is a top view of the meter housing.

FIG. 8 is a fragmentary front elevation view of the upper end portion of the meter housing.

FIG. 16 is a detail plan view of the gauging and locking means of this invention.

FIG. 17 is a side view of the gauging and locking means of FIG. 16, illustrated in their relative level relationship with respect to the coin carrier.

FIG. 18 is a sectional view of a fragmentary portion of the washer dog taken along line 18—18 of FIG. 3.

Figure 2:
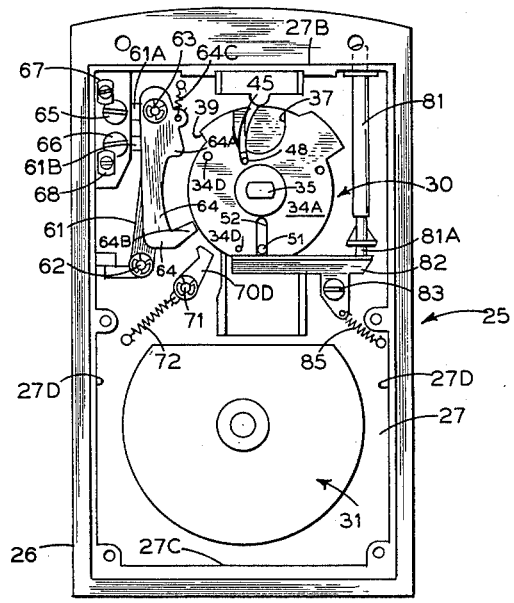
FIG. 2 is a rear view of the coin meter with the back casting removed to illustrate the cooperative relationship of the internal components.

Referring to the drawing, the rotary coin meter 25 of this invention comprises a housing 26 which is preferably formed in two parts, i.e. a front casting 27 and a rear casting 28. The front casting 27 includes a front wall portion 27A and integrally connected top, bottom and opposed side wall portions 27B, 27C and 27D, respectively. Fitted in an appropriate opening in the top wall portion 27B is a coin receiver 29 having an appropriate coin slot for receiving a given coin denomination. As shown in FIG. 7, the coin receiver 29 is provided with a pair of coin slots 29A, 29B. The slots 29A, 29B may be sized for receiving either a coin of similar or dissimilar denominations. In the illustrated embodiment, the coin slots 29A, 29B are sized for receiving for example, a five cent coin and a ten cent coin. However, it will be understood the inventive concept of this invention is readily adapted to any coin denomination or combinations thereof.

Figure 1:
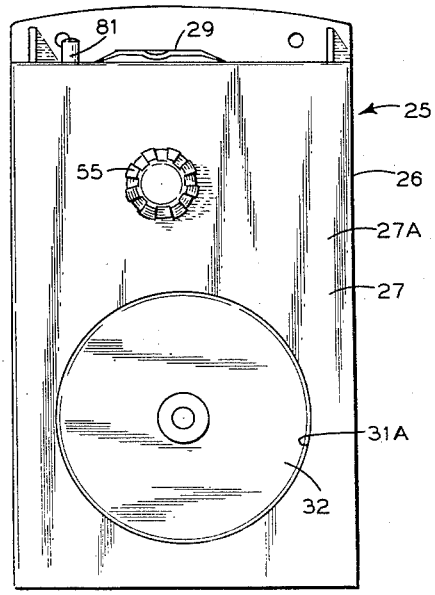
FIG. 1 is a front elevation view of the coin meter of this invention.

The front and rear casting 27, 28 which make up the housing 26 proper are each constructed and arranged to complement one another so that in the assembled position they define in the upper portion thereof means for rotatably journaling therebetween a duplex coin carrier 30, and in the lower portion thereof a coin receiving chamber or box 31. As shown in FIG. 1 a circular closure 32 closes an access opening 31A to the coin chamber 31 of the meter.

Figure 9:
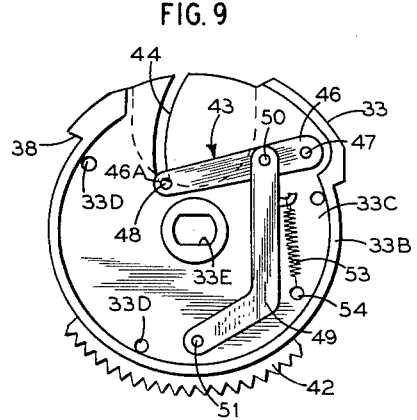
FIG. 9 is a detail inside view of the front half section of the coin carrier of the invention, and the ejecting means carried thereby.
Figure 10:
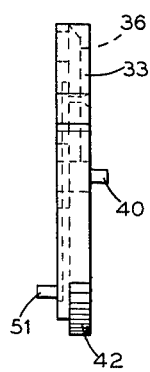
FIG. 10 is an end view of FIG. 9.
Figure 11:
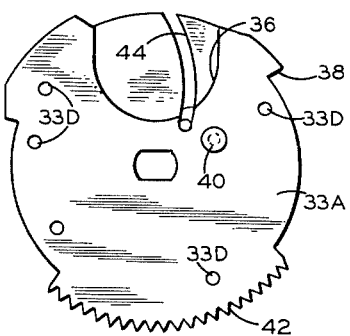
FIG. 11 is the outside view of the coin carrier half section of FIG. 9.

Journal on a shaft 35 extending through and between the front end and rear casting 27, 28 of the housing proper in the coin carrier 30. The coin carrier 30 is preferably formed of two disc like members 33 and 34, each of which comprises a half section of the carrier 30. Referring to FIGS. 9 to 11, the front half section 33 of the carrier 30 comprises a substantially circular casting having a relatively smooth flat outer surface 33A. The other side of the carrier section 33 is provided with a circumscribing flange or ridge 33B so as to define an internal recessed portion 33C.

Figure 12:
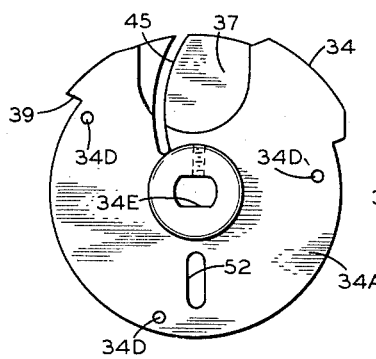
FIG. 12 is an outside view of the other or back half section of the coin carrier.
Figure 13:
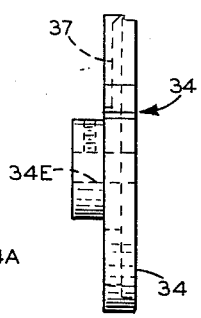
FIG. 13 is an end view of FIG. 12.
Figure 14:
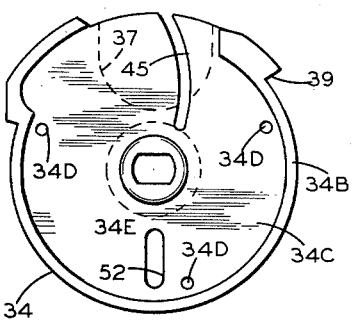
FIG. 14 is an inside view of FIG. 12.
Figure 15:
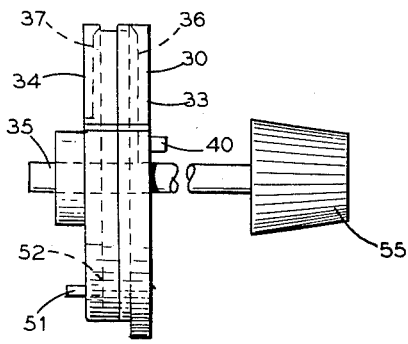
FIG. 15 is the assembled end view of the coin carrier.

The rear half section 34 of the carrier 30, as shown in FIGS. 12 to 14, is somewhat similar in construction. It comprises a disc like element having a smooth outer surface 34A and a recess inner portion 34C defined by a circumscribing flange portion 34B. In the assembled position of the carrier sections 33, 34, as shown in FIG. 15, the flange portion 33A, 33B of the respective disc like members 33, 34 abut one another to define a hollow carrier 30. The half sections 33, 34 are secured by any suitable fastener which extend through apertures 33D and 34D of the respective half sections 33, 34. Each of the half sections 33, 34 is provided with a central shaft opening 33E, 34E through which the mounting shaft 35 extends.

According to this invention the outer surface 33A, 34A of each carrier section 33, 34 has formed therein a coin seat or recess 36, 37 respectively for receiving a given coin, the respective coin seat 36, 37 being sized to receive a given sized coin. As shown the coin seats 36, 37 are open at their upper end. In the assembled position of the coin carrier 30 within the meter housing 26, the internal wall porions of the respective housing castings 27, 28 cooperate with the smooth outer surface of the juxtapositioned coin carrier half section to laterally retain the coin with the coin seat of the carrier.

As shown, each of the coin carrier half sections 33, 34 is provided with a projecting shoulder portion 38 and 39 respectively. Also the outer surface 33A of the front half section 33 is provided with a laterally extending stop pin 40 which is adapted to ride in the arcuate groove 41 (see FIG. 3) formed on the inside surface of the front casting 27.

The front half section 33 of the carrier adjacent the lower peripheral edge portion is also provided with a gear or ratchet sector 42. As will be hereinafter described the ratchet sector 42 commits the operation of the meter when the carrier 30 has been rotated a predetermined angular distance when proper sized coins are positioned in the respective coin seats 36 and 37.

In accordance with this invention a coin ejector means 43 is disposed within the hollow or recess of the front half section 33 of coin carrier 30. As shown in FIGS. 9 and 12 each carrier half section 33 and 34 is provided with an arcuate slot 44, 45 that extends in a generally radially direction in the vicinity of the respective coin seats 36, 37. Mounted on the inside of carrier section 33 is a lever 46 which is pivoted at 47. The free end 46A of the lever 46 is provided with an ejecting pin 48 which extends laterally to either side of the lever 46 so as to be received in slots 44 and 45 disposed in either side of lever 46.

An actuating lever 49 is pivoted to the lever 46 at 50.

The other or free end of the actuating lever 49 has a pin 51 connected thereto which is adapted to project out through a vertical slot 52 formed in the other half section 34 seen in FIGS. 12 and 15. A spring 53 anchored at 54 at one end and connected to the actuating lever 49 at the other end biases the ejecting lever 49 so that the ejecting pin 51 is normally seated at the bottom of the slot 52.

As best seen in FIG. 2, the carrier 30 in the assembled position of the meter is rotatably journaled between the front and rear wall portions of the housing by a shaft 35 which extends therethrough. Fixed to the front end of the shaft 35 is a knob 55 by which the shaft 35 and coin carrier 30 fixed thereto is rotated. As shown in FIGS. 9 and 12 the respective coin carriers 33, 34 have a central aperture or opening 33E, 34E formed with a flat side for keeping the same fixed or keyed to shaft 35. In this manner the carrier 30 is made to rotate with the shaft when the knob 55 is rotated. As viewed in FIG. 2, the coin carrier 30 is set to rotate in a counter clockwise direction upon rotation of the knob 55. In the normal inoperative position of the carrier 30, the respective coin seats 36, 37 are disposed in alignment with the coin slots 29A and 29B of the coin receiver 29. Thus it will be apparent that coins deposited in the respective coin slots 29A, 29B will drop into the corresponding coin seats of the carrier.

In accordance with this invention means are provided to detect between acceptable and unacceptable coins which may be deposited in the respective coin slots. The first coin detecting means comprises a permanent magnet 56 which is disposed in a recess defined in each of the respective housing castings 27 and 28. As shown in FIGS. 3 and 6, the magnet 56 is disposed directly opposite each of the respective coin seats 36, 37 in the inoperative position of the carrier 30. Accordingly, each casting 27 and 28 is formed so that the lower inside wall portion 57, 58 defining the magnet pocket has a recess 57A, 58A formed therein adapted to accommodate an unacceptable slug or simulated coin which is attracted to the magnet 56. Thus it will be noted that if a slug or simulated coin containing a high ferrous content is deposited in the coin slot, the slug will be laterally attracted toward the magnet so that it will rest in the adjacent pocket 57A or 58A. Because of the small clearance between the coin carrier 30 and the wall of the housing, the slug attracted to the magnet 56 will project slightly in the path of rotation of carrier 30 and thereby will prevent rotation of the carrier. Therefore, if a proper coin slug is deposited into either or both of coin slots 29A, 29B and it is attracted to either of magnets 56, the meter is rendered inoperative because the rotation of the carrier is prohibited.

Disposed within the housing and disposed to one side of the coin carrier 30 is an adjustable means 60 for detecting an improperly sized coin. An adjustable means 60 is provided for each section 33, 34 of the carrier. Each of the adjusting means 60 is substantially similar in construction. As best seen in FIGS. 2, 16 and 17 each adjusting coin detecting means 60 includes an adjusting lever 61 which is pivoted at one end on pivot pin 62 which is connected to the housing 26. Pivoted about pin 63 to the free end of the adjusting lever 61 is a gauging and locking lever 64. As shown the gauging lever 64 has a gauge node 64A adjacent one end thereof and a latching or locking hook 64B at the free end thereof. A spring 64C anchored at 64D biases the gauging and locking lever 64 toward normal locking engaging position relative to the carrier 30.

As shown in FIG. 17 each of the gauging and locking levers 64 are disposed in a plane common to the plane of the coin seats 36 and 37 of the coin carrier 30. The position of the respective locking levers 64 is such that the gauge node 64A thereof is positioned so that it will engage the periphery of a coin seated in the corresponding coin seat 36 or 37.

Normally the spring 64C biases the locking lever 64 toward operative position. In normal operative position, the hook end 64B of the lever 64 is disposed in the path of travel of the shoulder 38 or 39 of the coin carrier 30. Thus, if an attempt is made to rotate the coin carrier 30 without a proper coin seated in the respective coin seats 36, 37, only limited rotation of the coin carrier is possible. This is because the locking hook 64B of the lever 64 will engage shoulder 38–39 of the carrier, and thus prohibit the degree of rotation necessary to energize a timer mechanism (not shown) for actuating a machine cycle. Accordingly, it will be noted that each locking lever is independently operated.

The locking action of the locking levers 64 is rendered inoperative when a properly sized coin is disposed in each of the coin seats. This is attained by the predetermined relationship between the gauging node 64A and the periphery of a properly sized coin in position in the corresponding coin seat. With a coin of proper size, disposed in the respective coin seat 36, 37, initial rotation of the coin carrier will cause the periphery of the coin to cam the node 64A of the lever an amount sufficient to pivot the lever 64 so that locking hook 64B clears the shoulder 38 or 39 of the carrier 30. With both locking hooks 64B clear of the respective shoulders 38, 39 of carrier 30, rotation of the carrier can be complete so that upon a rotation of approximately 180° the respective coins are discharged into the coin chamber and the timer mechanism (not shown) energizes the machine cycle. If an undersized coin is disposed in the coin seat, the periphery thereof will pass beneath the cam node 64A without effecting the camming action necessary to clear the latching hook 64B thereof free of the shoulder 38, 39. Thus complete rotation of the coin carrier is prohibited, and the machine cycle is not initiated.

If an oversized coin is disposed in the coin seat, the diameter of such coin will be such that its passage past the cam node is prohibited. Thus rotation of the carrier 30 beyond initial engagement of an oversized coin with the cam node 64A is prohibited. It will be therefore noted that the carrier 30 can only be rotated its prescribed angular distance necessary to actuate a timer (not shown) only when properly sized coins are deposited in the respective coin seat. Because a locking lever 64 is provided for each coin seat, it is imperative that both coins carried in the coin carrier 30 be of proper size before the coin meter is rendered operative.

Means are provided for individually adjusting the position of the gauging and locking lever 64 to accommodate for mechanical tolerances between cooperating parts of the meter and normal wear thereof. As shown each of the adjusting levers 61 is provided with an abutment 61A, 61B which are adapted to engage its respective adjusting cam 65, 66. Adjusting cams 65, 66 are eccentrics which are rotated to adjust the position of the adjusting lever 61 and connected locking lever 64 relative to the coin carrier 30. A lock means in the form of a flanged screw 67, 68 is provided to lock the adjusting cam 65, 66 respectively in their adjusted position. The flange of the respective lock screws 67, 68 when tightened will serve to hold the cam eccentricts 65, 66 in adjusted position.

To detect for washer type slugs, a washer dog 69 is provided. As shown, a washer dog 69 is connected to the inside surface of both housing castings 27 and 28. The washer dog 69 comprises a flat spring fixed at one end 69A to its respective casting. The free end of the washer dog is provided with a ratchet hook 70 defined by an inclined portion 70A and a stop portion 70B. Normally the ratchet hook 70 end of the dog 69 is biased against the outer surface of the adjacent carrier half section. The arrangement is such that in the event a washer has been seated in one or both of the coin seats of the coin carrier 30, initial rotation of the carrier will cause the ratchet hook end 70 of the washer dog 69 to snap into the opening of the washer slug as the carrier is rotated. With the washer dog snapped into the washer opening further rotation of the coin carrier 30 is prohibited for the reason that the washer cannot bypass the stop portion 70B of the washer dog. The inclined portion 70A of the washer dog 69 functions as a cam to permit the carrier 30 to be returned to normal inoperative position in the event a washer is deposited. In this manner jamming of the coin meter is averted, and ejection of the slug washer can be attained by actuation of the rejecting means 80, hereinbefore described.

In the event an unscrupulous person attempts to circumvent proper operation of the coin meter by the use of adhesive tape to prevent the coins from dropping out of the coin carrier after actuating of the machine cycle, means are provided for cutting tape so employed. As shown in FIG. 3, the tape cutting means include a tape cutting dog 70D pivoted to the housing 26 about pin 71. The cutting dog 70D is normally biased toward operative position by spring 72. The cutting dog 70D is provided with a relatively sharp cutting edge 73 which is positioned so as to engage the periphery of the coin carrier. Thus, if any tape has been employed it will be cut by the cutting dog 70D as the carrier is rotated past the cutting edge 73. Rotation of the carrier beyond the cutting dog 70D is possible, of course, only if acceptable coins are deposited in the respective coin seats.

In the event it is desired to eject the coins from the coin carrier 30, an externally operated rejecting means 80 is provided to actuate on the ejecting means 43 disposed within the coin carrier 30. As shown in FIG. 3, the rejecting means 80 comprises a plunger rod 81 which extends outwardly through the top 27B of the housing 26. The lower end 81A of the rod 81 engages one end of a rejecting lever 82 which is fulcrumed intermediate the ends thereof about pivot 83. The other end of the rejecting lever is arranged to engage the pin 51 of the ejecting mechanism 43 in the carrier 30. Thus, to eject the coins from the carrier 30 for any reason, the plunger 81 is depressed. Depression of the plunger in turn will cause the rejecting lever 82 to pivot clockwise about its fulcrum 83, as viewed in FIG. 3. The pivoting action of the rejecting lever 82 in turn displaces the pin 51 and connected actuating lever 49 upwardly. Upward movement of lever 49 pivots ejecting lever 46 of the ejecting means 43 upwardly to displace ejecting pin 48 in slots 44, 45 thereby forcing the coins up and out of the coin seats. It will be noted that the rejecting means 80 is rendered operative only when the carrier 30 is disposed in its normal inoperative position wherein coin seats 36, 37 are in alignment with coin slots 29A, 29B. A spring 85 is provided to apply the force required to return the rejecting means 80 to its inoperative position.

The illustrated embodiment also contemplates means positively committing the operation of the coin meter after the coin carrier 30 has been rotated beyond a predetermined point. These means include the gear or ratchet sector 42 connected to the front carrier sectcion 33 and a cooperating ratchet pawl 90 pivotally connected to the front housing casting 27. The gear section 42 and pawl 90 are constructed so that upon engagement of the gear sector 42 by the pawl 90 upon a predetermined amount of angular rotation of the carrier 30, the rotation of the carrier is thus committed and rendered unidirectional until the pawl is disengaged at the limit of the carrier rotation. That is, engagement between the gear sector 42 and pawl 90 permits rotation of the carrier 30 only in a counter-clockwise direction, as viewed in FIG. 2. With proper coins disposed in the respective coin seat 36, 37 operation of the coin meter is committed upon initial rotation of the carrier at which time the gauge lever is pivoted to clear the locking hook 64B thereof free of shoulder stops 38, 39.

To return the coin carrier to its normal inoperative position, upon release of the turn knob 55, a spring 95 is provided. See FIG. 6. The spring 95 is anchored at one end to the rear housing casting 28, and has its other end connected to the pulley 96 fixed to shaft 35. Thus it will be noted that rotation of the shaft 35 will tend to wind the spring 95 about the pulley 96. This action will stretch the spring 95, the reaction of which will return the shaft 35 and connected carrier 30 to their normal inoperative position upon release of the knob 55.

In operation the coin meter described is as follows:

The coin meter 25 described is adapted for use on any coin operated vending machine, washer, drier or the like. Generally the coin meter 25 is operatively connected with a timer device (not shown) for activating the machine cycle as is well known in the art. The arrangement is such that the timer device (not shown) is actuated only when the coin carrier 30 has advanced or rotated an amount sufficient to commit the deposits of the acceptable coins carried thereby into the coin box 31 of the meter.

In accordance with this invention two coins of proper denominations and size are required to be deposited in the coin slots 29A and 29B. Upon insertion of the coins in their respective slots 29A, 29B and received in coin seats 36, 37, the coin carrier 30 is rotated by appropriate actuation to the control knob 55. If proper coin denomination and coin size have been deposited into the respective coin slots and consequently into the respective coin seats 36, 37 of the carrier 30 initial angular rotation of the coin carrier 30 and coins carried therein will effect camming of the locking lever 64 toward inoperative position, thus permitting continued rotation and commitment of the coin carrier to a point where the coins are discharged to the coin box. Upon discharge of the coins, suitable means (not shown) are actuated to energize a timer (not shown) controlling the operating cycle of the vending machine operated by the instant coin meter. In the event that one or both of the coins deposited are unacceptable, rotation of the coin carrier beyond its initial angular amount and to the point of committal is prohibited. As hereinbefore described, detection of unacceptable coins or the like is had by use of permanent magnets 56, washer dogs 69 and/or the gauging and locking lever 64.

From the foregoing, it will be apparent that the rotary coin meter constitutes a relatively compact instrument in which the vertical drop of the coin therethrough is greatly minimized over the known type of coin meters having vertically arranged coin rejecting means. Also the instant invention contemplates various coin detecting means capable of detecting each of the common unacceptable type of coins and the like, thus rendering the coin meter 25 virtually foolproof against the use of slugs, washers, and counterfeit type coins. The instant coin meter is therefore rendered efficient and mechanically positive in operation. Relatively few moving parts are involved. Also adjusting means are provided for accommodating wear and machine tolerances between the cooperating parts of the meter.

While the instant invention has been disclosed with reference to a particular embodiment, it is to be appreciated that the invention is not to be taken as limited to all of the details thereof as modifications and variations thereof may be made without departing from the spirit or scope of the invention.

What is claimed is:

1. A coin meter comprising a housing having a coin slot formed in one end thereof, a coin carrier, said coin carrier including a hollow disc-like element, said element having a recess formed in the side surface of said element for accommodating a coin deposited in said slot, means for rotatably journaling said element within said housing so that the recessed side surface thereof is juxtapositioned closely adjacent a wall portion of said housing so that said wall portion cooperates with the recessed side surface to define the coin pocket open at one end only, ejecting means carried within the hollow of said element for rotation therewith, and means operative from without said housing for actuating said coin ejecting means within said element whereby said ejecting means is displaced to eject any coin deposited in said pocket when the open end of said coin pocket is disposed in alignment with said slot.

2. A coin meter comprising a housing having a coin slot formed in one end thereof, a coin carrier, said coin carrier including a hollow disc-like element, said element having a recess formed in the side surface of said element for accommodating a coin deposited in said slot, means for rotatably journaling said element within said housing so that the recessed side surface thereof is juxtapositioned a wall portion of said housing so that said wall portion cooperates with the recessed side surface to define the coin pocket open at one end only, said side surface of said element having an arcuate slot extending in a radial direction therethrough in the area of said recess, ejecting means carried within the hollow of said element for rotation therewith, said latter means including an ejector pin in register with said arcuate slot, and means operative from without said housing for actuating said coin ejecting means within said element whereby said ejecting pin is displaced radially of said element for ejecting any coin deposited in said pocket when the open end of said coin pocket is disposed in alignment with said slot.

3. The invention as defined in claim 2 wherein said ejecting pin is carried in a lever pivotally mounted within said element, and a lever operator connected to said lever for effecting displacement thereof about its pivot, and said means for actuating said ejecting means including a plunger mounted on said housing so as to be actuated from the outside of said housing, and a transmission lever operatively associated with said plunger and said lever operator whereby the movement of said plunger is transmitted to said ejector lever to effect ejection of the coin from said slot.

4. A coin meter comprising a housing having a pair of coin slots formed in one end thereof, a coin carrier, said coin carrier including a hollow disc-like element, said element having a recess formed in the opposed side surfaces of said element for accommodating the coins deposited in each of the respective slots, means for rotatably journaling said element within said housing so that the opposed recessed side surfaces thereof are juxtapositioned the opposed wall portions of said housing so that said wall portions cooperate with the adjacent recessed side surfaces of said element to define a pair of coin pockets, each being open at one end only, each of said side surfaces of said element having an arcuate slot extending in a radial direction therethrough within the area of said recesses, ejecting means carried within the hollow of said element for rotation therewith, said latter means including an ejector lever pivoted within the hollow of said element, an ejecting pin carried on the free end of said lever, said pin being in register with the arcuate slot in each of the side surfaces of said element, a lever operator connected to said ejector lever for effecting displacement of said ejector lever about its pivot, and means operative from without said housing for actuating said coin ejecting means within said element whereby said ejecting pin is displaced radially of said element for ejecting any coin deposited in said pockets when the open end of said coin pocket is disposed in alignment with said slots.

5. A two coin rotary meter comprising a front casting and a rear casting to define a housing, said housing having a pair of coin slots disposed in side by side relationship formed in one end of said casting, a coin carrier means having outer surfaces, means for rotatably journalling said coin carrier means in said housing between said casting, said coin carrier means having a coin recess adapted to receive and retain a coin therein, said coin recesses being formed in each outer surface of said coin carrier means, said carrier means being normally disposed within said housing so as to have the respective coin recesses disposed in alignment with said slots so that coins deposited in each of said slots are respectively received and retained in the aligned coin recesses of said carrier means, means for rotating said carrier means between coin receiving position and coin discharging position wherein the coins fall from said recesses, and means connected to said housing adjacent said coin carrier means for gauging the size of the respective coins received in said coin recesses, said gauging means being rendered operative upon initial rotation of the coin carrier means and said gauge means including means for preventing rotation of said coin carrier means to coin discharging position in the event an improperly dimensioned coin is deposited, and means for adjusting said gauging means to accommodate working tolerances and wear, said gauge means including an adjusting lever pivoted at one end to said housing, and a gauging lever, said gauging lever being pivoted at one end to the free end of said adjusting lever, said gauging lever having a gauge portion adjacent one end of said gauging lever adapted to engage the periphery of a coin as said coin carrier means is rotated for determining the acceptability of said coin.

6. The invention as defined in claim 5 wherein said gauge lever includes a stop portion adjacent the opposite end of said gauging lever for preventing rotation of said carrier means in the event an improperly sized coin is positioned in said coin recess.

7. The invention as defined in claim 6, said means for adjusting said gauge means to correct for manufacturing tolerances and wear including an eccentric cam adapted to operate on said adjusting lever.

References Cited by the Examiner
UNITED STATES PATENTS

| | | | |
|---|---|---|---|
| 1,154,381 | 9/15 | Corbet | 194—65 |
| 1,842,243 | 1/32 | Boyer | 194—63 |
| 1,983,073 | 12/34 | Du Grenier | 194—63 |
| 2,066,820 | 1/37 | Brown | 194—1 |
| 2,082,037 | 6/37 | Tratoch | 194—97 |
| 2,091,232 | 8/37 | Vogel | 194—97 |
| 2,321,136 | 6/43 | Grau | 194—61 |
| 2,628,698 | 2/53 | Parrish | 194—61 |
| 2,666,514 | 1/54 | Stewart | 194—61 |

SAMUEL F. COLEMAN, *Primary Examiner.*

WILLIAM B. LA BORDE, *Examiner.*